(12) United States Patent
Cui et al.

(10) Patent No.: US 11,291,067 B2
(45) Date of Patent: Mar. 29, 2022

(54) DETECTION OF FAILURE IN A BACKHAUL COMMUNICATIONS LINK

(71) Applicant: AT&T INTELLECTUAL PROPERTY I, L.P., Atlanta, GA (US)

(72) Inventors: Zhi Cui, Sugar Hill, GA (US); Hongyan Lei, Plano, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 188 days.

(21) Appl. No.: 16/290,507

(22) Filed: Mar. 1, 2019

(65) Prior Publication Data

US 2020/0281037 A1    Sep. 3, 2020

(51) Int. Cl.
| | |
|---|---|
| *H04W 76/18* | (2018.01) |
| *H04B 17/318* | (2015.01) |
| *H04W 24/08* | (2009.01) |
| *H04W 48/20* | (2009.01) |
| *H04W 76/15* | (2018.01) |
| *H04W 88/14* | (2009.01) |
| *H04W 24/04* | (2009.01) |
| *H04B 17/382* | (2015.01) |

(Continued)

(52) U.S. Cl.
CPC .......... *H04W 76/18* (2018.02); *H04B 17/318* (2015.01); *H04B 17/382* (2015.01); *H04W 24/04* (2013.01); *H04W 24/08* (2013.01); *H04W 48/20* (2013.01); *H04W 76/15* (2018.02); *H04W 76/19* (2018.02); *H04W 88/14* (2013.01); *H04W 88/08* (2013.01); *H04W 88/12* (2013.01); *H04W 92/20* (2013.01)

(58) Field of Classification Search
CPC ..... H04W 76/18; H04W 48/20; H04W 76/15; H04W 24/08; H04W 88/14; H04W 88/12; H04W 92/20; H04W 76/19; H04B 17/318
See application file for complete search history.

(56) References Cited

U.S. PATENT DOCUMENTS 7,640,020 B2 * 12/2009 Gutowski .......... H04L 41/0896
                                                370/395.21
9,705,949 B2    7/2017 Cui et al.
(Continued)

FOREIGN PATENT DOCUMENTS

EP     2451211       5/2012
WO     2018031170    2/2018

*Primary Examiner* — Omar J Ghowrwal
(74) *Attorney, Agent, or Firm* — Amin, Turocy & Watson, LLP

(57) ABSTRACT

Various embodiments disclosed herein provide for reestablishing a backhaul connection due a failed connection. According to some embodiments, a system can comprise detecting a failure in a backhaul communication link between a first node device and a second node device, wherein the second node device is communicatively connected to a core network device of a core network, selecting a new node device, other than the first node device and the second node device, that is communicatively connected to the core network device for establishment of a new backhaul communication link to replace the backhaul communication link, and establishing a connection with the new node device to provide a backhaul communication link failure indication to a controller and to request the controller to provide resources to establish the new backhaul communication link with the new node device.

20 Claims, 10 Drawing Sheets

(51) Int. Cl.
*H04W 76/19* (2018.01)
*H04W 88/08* (2009.01)
*H04W 88/12* (2009.01)
*H04W 92/20* (2009.01)

(56) References Cited

U.S. PATENT DOCUMENTS

| | | |
|---|---|---|
| 9,860,075 B1 | 1/2018 | Gerszberg et al. |
| 2007/0110004 A1 | 5/2007 | Liu et al. |
| 2007/0110005 A1 | 5/2007 | Jin et al. |
| 2015/0373615 A1 | 12/2015 | Hampel |
| 2016/0014681 A1* | 1/2016 | Yi .................. H04W 48/16 455/422.1 |
| 2016/0255613 A1 | 9/2016 | Faerber et al. |
| 2016/0337931 A1* | 11/2016 | Wang ............... H04W 48/20 |
| 2017/0070919 A1* | 3/2017 | Verger .............. H04L 67/148 |
| 2017/0289047 A1 | 10/2017 | Szilágyi et al. |
| 2017/0331577 A1 | 11/2017 | Parkvall et al. |
| 2017/0331670 A1 | 11/2017 | Parkvall et al. |
| 2017/0347236 A1* | 11/2017 | Frusina ........... H04N 21/41422 |
| 2018/0063827 A1 | 3/2018 | Soysal et al. |
| 2018/0167961 A1 | 6/2018 | Hao et al. |
| 2018/0288823 A1 | 10/2018 | Hampel et al. |
| 2018/0352524 A1 | 12/2018 | Abedini et al. |
| 2019/0394825 A1* | 12/2019 | Byun ............... H04W 76/11 |
| 2020/0077310 A1* | 3/2020 | Cheng ............. H04W 36/305 |
| 2020/0092784 A1* | 3/2020 | Hampel ........... H04W 72/1268 |
| 2020/0260519 A1* | 8/2020 | Jeon ................ H04W 40/02 |
| 2021/0014706 A1* | 1/2021 | Cui ................. H04W 24/04 |
| 2021/0315040 A1* | 10/2021 | Wu ................. H04W 48/20 |

* cited by examiner

DETECTION OF FAILURE IN A BACKHAUL COMMUNICATIONS LINK

TECHNICAL FIELD

This disclosure relates generally to a self-backhaul network architecture for a 5G new radio (NR) networks. More specifically, facilitating a self-backhaul communication system that dynamically reconfigures 5G self-backhaul when a connection fails.

BACKGROUND

5th generation (5G) wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating a self-backhaul communication system that dynamically reconfigures 5G self-backhaul when a connection fails is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
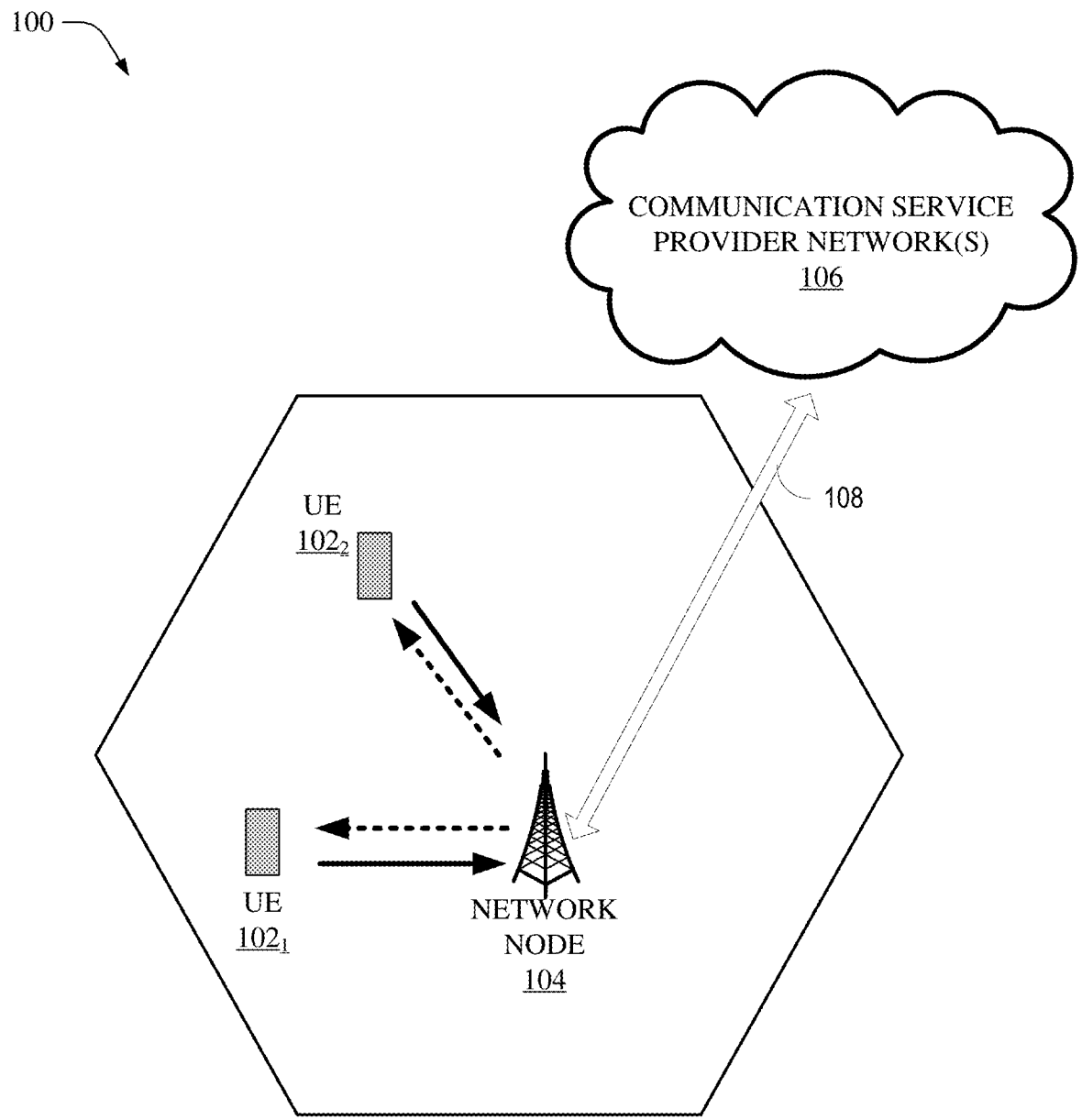
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a self-backhaul communication system that dynamically reconfigures 5G self-backhaul when a connection fails. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), WI-FI™, Worldwide Interoperability for Microwave Access (WIMAX™), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), ZIGBEE™, or another IEEE 802.XX technology. Additionally, substantially all aspects disclosed herein can be exploited in legacy telecommunication technologies.

Described herein are systems, methods, articles of manufacture, and other embodiments or implementations that can facilitate dynamic reconfiguration of 5G backhaul connection upon detecting a connection failure. Facilitating dynamic reconfiguration of 5G backhaul connection can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology In some embodiments, a 5G mobile network comprises interconnected small cells (also referred to as "relay node devices" or "network node devices") forming a small cell backhaul network (e.g., self-backhaul). In some embodiments, the small cell can be a network device operating utilizing millimeter wave (mmW) spectrum (e.g., higher frequencies, 30 gigahertz (GHz)-300 GHz) and comprises transmitter and receiver that are equipped with multiple antennas for wired and/or wireless communication. The 5G mobile networks can be deployed using wired (e.g., fiber backhaul) and wireless (e.g., self-backhaul) technology to connect small cells to a macro cell, wherein the macro cell is communicatively connected to the core network. For example, several small cells operating in multiple bands can be connected to a macro cell, wherein 5G mobile networks support various applications. Ultra-reliability and low latency are key features of the 5G network. High level of densification of small cells with mmW transmit and receive point (TRP) and self-backhaul capability are the technology advances of 5G to meet the bandwidth demand. In one embodiment, internet protocol tunnel between the cells and core network is created to support the various application and high bandwidth demands, wherein the individual connection is monitored by the small cells. The internet protocol tunnel can be used for transmission of data directed to user equipment devices from the core network and transmission of data from user equipment via the small cell network to the core network. To achieve the high reliable 5G network, improving the transport availability of the mmW TRPs (e.g., small cells) is critical. As 5G needs to support various applications including enhanced mobile broadband (eMBB), mission critical, and ultra-reliable low-latency communication (URLLC) application, maintaining the connection is crucial. Due to various factors, such as weather, network traffic, or physical break in wired connection (e.g., fiber cable accidently cut or damaged), the connection between the small cells and core network can fail (e.g., failure of self-backhaul connection) anytime. Disclosed herein are solutions that enable dynamic trigger and reconfiguration of 5G mmW TRP self-backhaul connection when the backhaul connection or the existing mmW self-backhaul connection (e.g., backhaul connection between other mmW TRPs or small cells) to network fails. The advantage of the described solution is that it enables dynamic and automatic self-backhaul as a redundant link to the mmW cell to improve the reliability of the 5G mobile network.

In some embodiments, a relay device can comprise a processor and a memory that stores executable instructions that, when executed by the processor, facilitate performance of operations comprising detecting a failure of a backhaul communication link. The relay device scans for best suitable cell (e.g., a cell with strongest radio frequency (RF) signal) to establish a connection. If the failed connection was a fiber backhaul connection (e.g., failed wired connection between the relay device and the macro cell), then the relay device can attempt to reestablish connection with macro cell using a wireless connection. In some embodiments, based on network conditions, the relay device can initiate a wireless connection directly with the macro cell or initiate a connection via another relay device that is communicatively connected to the core network. The relay device transmits signal to the macro cell, wherein the signal comprises a message indicating connection failure and request for new resources to establish a new connection. In some embodiments, minimum bandwidth (e.g., sufficient to carry 8 bits of information) is employed to transmit the signal to the macro cell. The macro cell thereafter relays the message to a controller (e.g., SDN controller) that maintains a graph of the network. The controller determines the resources required based on network conditions and data analytics and provides resource setup information to the relay device via the macro cell. The relay device can initiate establishment of the connection using the resource setup information. The relay device can transmit an acknowledgement of the new connection to the controller via the macro cell. The controller can update the network graph in response to receiving the acknowledgement.

In some embodiments, a relay device can comprise a processor and a memory that stores executable instructions that, when executed by the processor, facilitate performance of operations comprising detecting a failure of a backhaul communication link. The relay device scans for best suitable node (e.g., a node with strongest RF signal) to establish a connection. The relay device selects a new node (e.g., another relay device or a macro cell) to establish a backhaul connection. In some embodiments, the selection of the new node is based on RF signal strength and/or location (e.g., geographically closest to the relay node). In some embodiments, the node with strongest RF signal strength is selected. In some embodiments, the relay device transmits a signal directly to a macro cell or via the selected node, wherein the signal comprises a message indicating connection failure and request for new resources to establish a new connection. In some embodiments, minimum bandwidth (e.g., sufficient to carry 8 bits of information) is employed to transmit the signal to the macro cell. The macro cell or the selected node thereafter relays the message to a controller (e.g., SDN controller) that maintains a graph of the network. The controller determines the resources required based on network conditions and data analytics and provides resource setup information to the relay device via the macro cell. The relay device can initiate establishment of the connection using the resource setup information received from the controller. The relay device can transmit an acknowledgement of the new connection to the controller via the macro cell or the selected. The controller can update the network graph in response to receiving the acknowledgement.

According an embodiment, a system can comprise a processor and a memory that stores executable instructions that, when executed by the processor, facilitate performance of operations comprising detecting a failure in a backhaul communication link between a first node device and a second node device, wherein the second node device is communicatively connected to a core network device of a core network. The system can further facilitate selecting a new node device, other than the first node device and the second node device, that is communicatively connected to the core network device for establishment of a new backhaul communication link to replace the backhaul communication link. The system can further facilitate establishing a connection with the new node device to provide a backhaul communication link failure indication to a controller and to request the controller to provide resources to establish the new backhaul communication link with the new node device.

According to another embodiment, described herein is a method that can comprise detecting, by a device comprising a processor, failure of a first backhaul communication link between a first node device and a second node device, wherein the second node device is communicatively connected to a core network. The method can further comprise scanning, by the device, for a third node device, which is communicatively connected to the core network, to establish a second backhaul communication link. The method can further comprise selecting, by the device, the third node device based on signal strength. The method can further comprise facilitating, by the device, establishing a connection with the third node device that employs a bandwidth sized to transmit a backhaul communication link failure indication, wherein the facilitating the establishing comprises sending a request for communication resources to establish the second backhaul communication link with the third node device.

According to yet another embodiment, a relay device can comprise a processor and a memory that stores executable instructions that, when executed by the processor, facilitate performance of operations comprising detecting a failure of a backhaul communication link between a first relay device and a second relay device, wherein the second relay device is communicatively connected to at least one core network device of a core network. The relay device can further comprise selecting a different relay device, other than the first relay device and the second relay device, for use in establishing a different backhaul communication link in response to detecting the failure of the backhaul communication link, wherein the different relay device is communicatively connected to the at least one core network device. The relay device can further comprise establishing a first connection with the different relay device, which employs a bandwidth sized as a function of a size of a transmission of a backhaul communication link failure indication and comprises requesting resources to establish the different backhaul communication link with the different relay device.

These and other embodiments or implementations are described in more detail below with reference to the drawings.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks WI-FI™ service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, WI-FI™, WLAN, WIMAX™, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
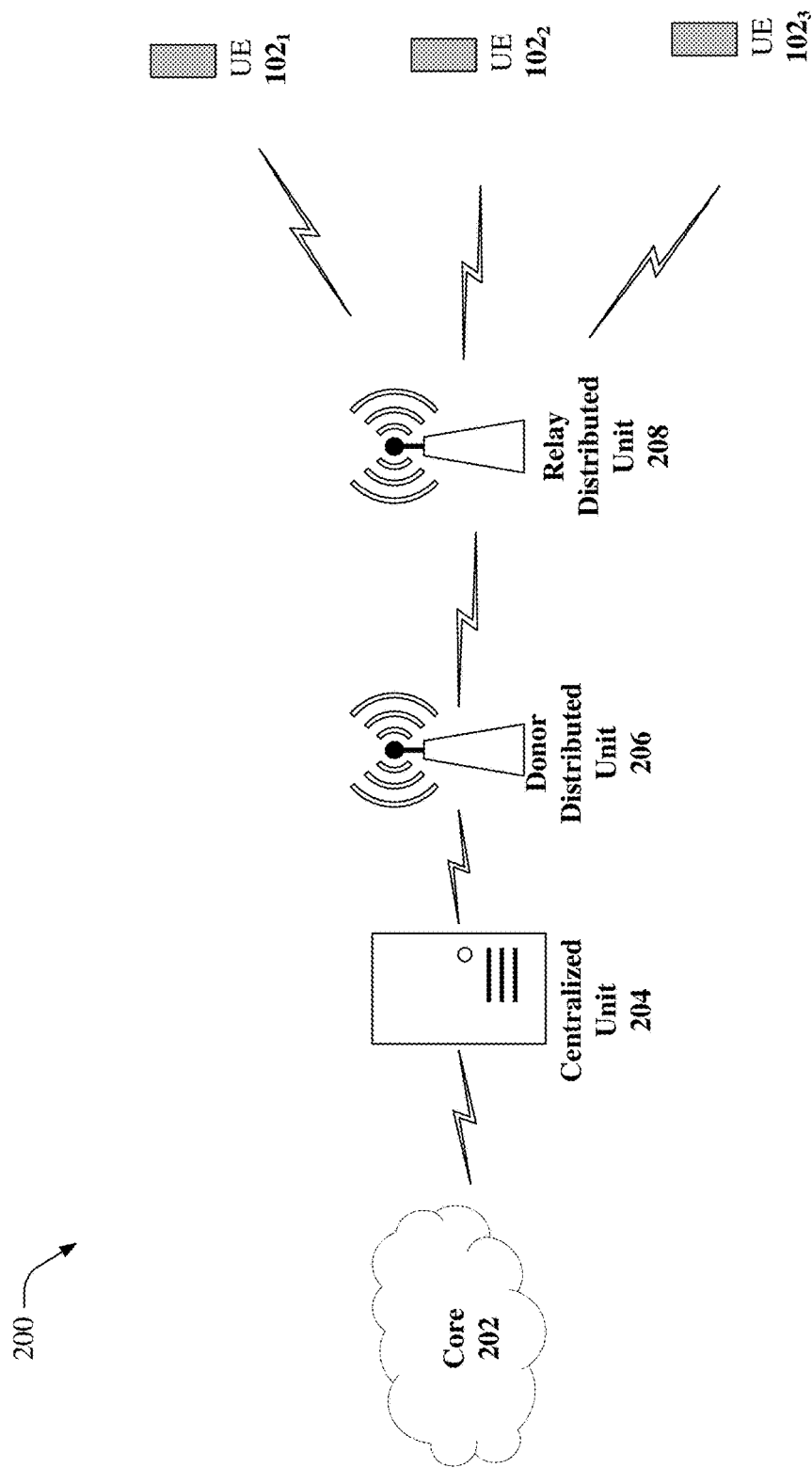
FIG. 2 illustrates an example schematic system block diagram of integrated access and backhaul links according to one or more embodiments.

Referring now to FIG. 2, illustrated is an example schematic system block diagram of integrated access and backhaul links according to one or more embodiments. For example, the network 200, as represented in FIG. 2 with integrated access and backhaul links, can allow a relay node to multiplex access and backhaul links in time, frequency, and/or space (e.g. beam-based operation). Thus, FIG. 2 illustrates a generic IAB set-up comprising a core network 202, a centralized unit 204, a donor distributed unit 206, a relay distributed unit 208, and UEs $102_1$, $102_2$, $102_3$. The donor distributed unit 206 (e.g., access point) can have a wired backhaul with a protocol stack and can relay the user traffic for the UEs $102_1$, $102_2$, $102_3$ across the IAB and backhaul link. Then the relay distributed unit 208 can take the backhaul link and convert it into different strains for the connected UEs $102_1$, $102_2$, $102_3$. Although FIG. 2 depicts a single hop (e.g., over the air), it should be noted that multiple backhaul hops can occur in other embodiments.

The relays can have the same type of distributed unit structure that the gNode B has. For 5G, the protocol stack can be split, where some of the stack is centralized. For example, the PDCP layer and above can be at the centralized unit 204, but in a real time application part of the protocol stack, the radio link control (RLC), the medium access control (MAC), and the physical layer PHY can be co-located with the base station wherein the system can comprise an F1 interface. In order to add relaying, the F1 interface can be wireless so that the same structure of the donor distributed unit 206 can be kept.

Figure 3:
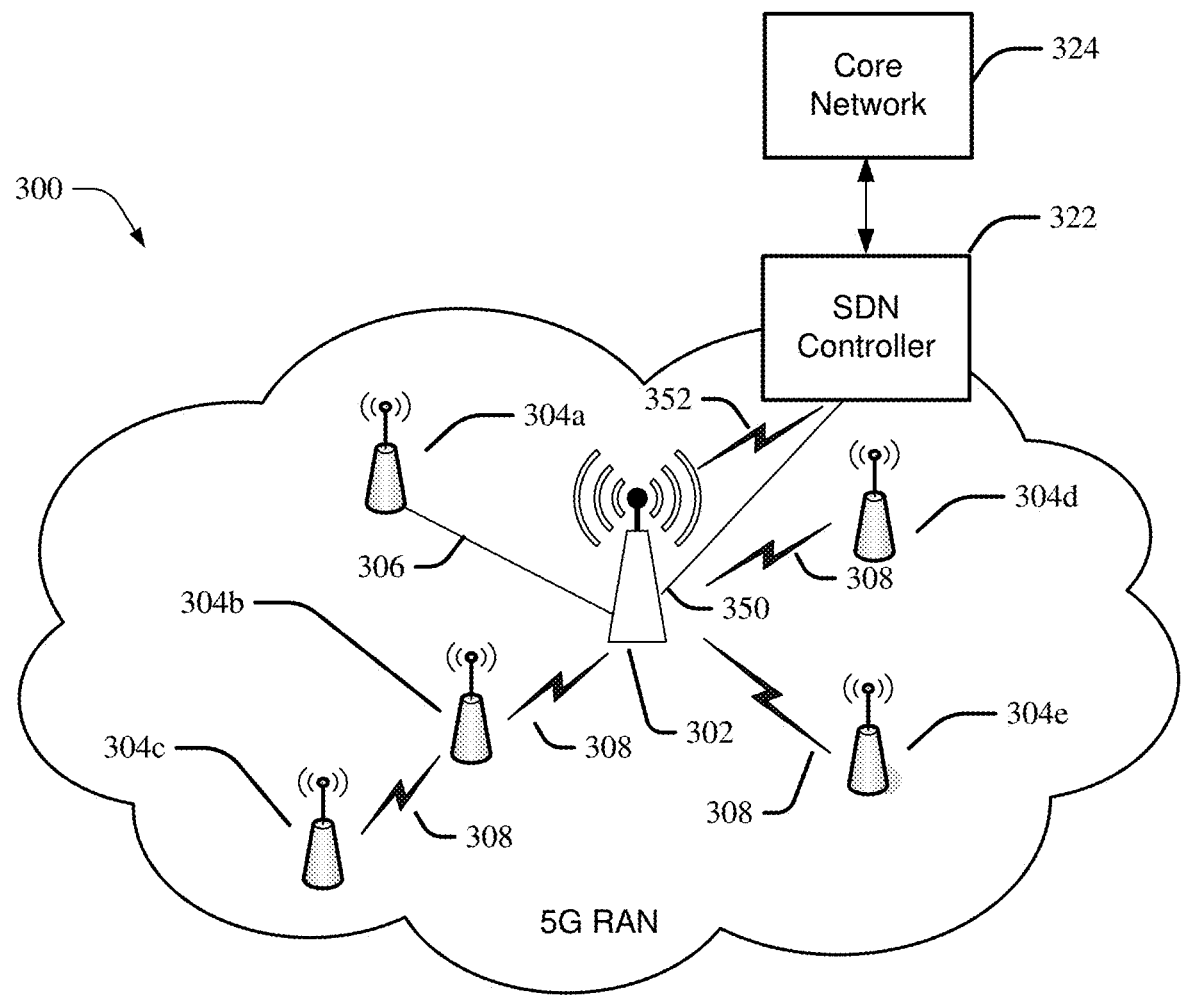
FIG. 3 illustrates an example small cell network according to one or more embodiments.

Referring now to FIG. 3, illustrated is an example a small cell (e.g., mmW TRP, a relay device or a node node) network 300 in accordance with various aspects and embodiments described herein. Repetitive description of like elements employed in other embodiments described herein is omitted for sake of brevity. In some embodiments, the small cell network 300 can comprise one or more small cells 304a-e (referred herein as "small cells 304") that are communicatively connected to a macro cell 302. The small cells 304 can be connected to the macro cell 302 via a wire connection (e.g., fiber backhaul connections) 306 and/or can be connected via a wireless connection (e.g., self-backhaul connection) 308. The macro cell 302 can be communicatively connected to an SDN controller 322 via wire connection 350 or wireless connection 352. The self-backhaul connection 308 can operate using a single band selected from multiple band. For example, but not limited to, mmW bands and Sub 6 GHz bands. The fiber backhaul connection 306 and self-backhaul connection 308 enable transportation of data between small cells and the core network 324.

Figure 4A:
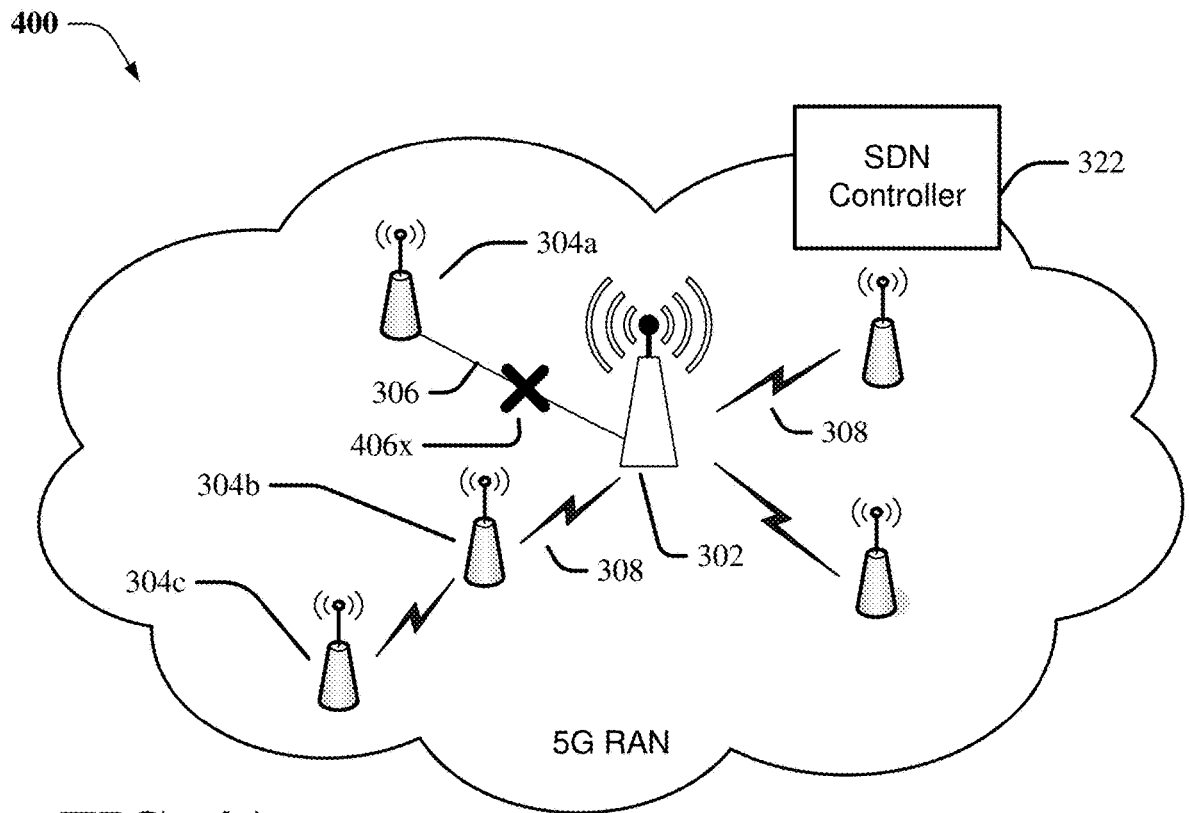
FIG. 4A-4B illustrates an example small cell network according to one or more embodiments.

Referring now to FIG. 4A, illustrated is an example a small cell network 400 having a failed wired (e.g., fiber backhaul) connection in accordance with various aspects and embodiments described herein. Repetitive description of like elements employed in other embodiments described herein is omitted for sake of brevity. In some embodiment, as illustrated, a connection failure 406x has occurred at fiber backhaul connection 306 between small cell 304a and macro cell 302. In response to detecting the connection failure 406x, the small cell 304a can scan nearby cells (e.g., macro cell or other small cells) to reestablish the connection. In some embodiments, the small cell 304a can ping the macro cell 302, small cell 304b and small cell 304c to select the new cell based on, but not limited to, RF signal strength between small cell 304a and the new cell (e.g., small cell or macro cell).

Figure 4B:
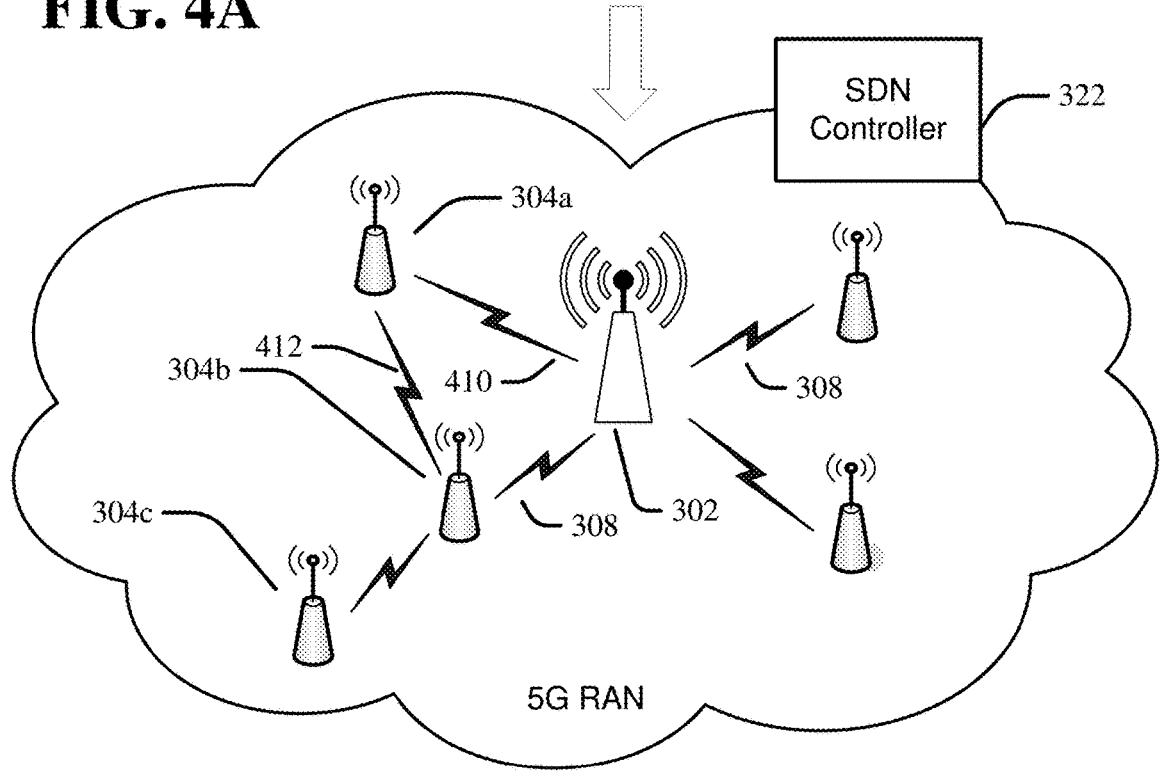

Referring now to FIG. 4B, illustrated is an example a small cell network 400 after having a new connection in accordance with various aspects and embodiments described herein. Repetitive description of like elements employed in other embodiments described herein is omitted for sake of brevity. In some embodiment, as illustrated, upon selecting a new cell, for example macro cell 302, a new connection 410 is established. As discussed below (FIG. 6), the small cell can transmit a signal using minimum bandwidth to notify the SDN controller 322, via the macro cell 302, that a connection failure has occurred, and new resources are needed to establish connection. In some embodiments, wireless resources are requested for establishing a connection 410 between the small cell 304a and the macro cell 302. In some embodiments, wireless resources are requested for establishing a new connection 412 between the small cell 304a and the small cell 304b. In some embodiments, the small cell 304a can send the signal to SDN controller 322 via small cell 304b, as well as the macro cell 302, that are communicatively connected to the SDN controller 322. In some embodiments, the new connection 410 is a wireless connection between small cell 304a and macro cell 302. In some embodiments, the SDN controller 322 can update the network graph indicating the connection 410 (or connection 412) upon receiving confirmation from the small cell 304a.

Figure 5A:
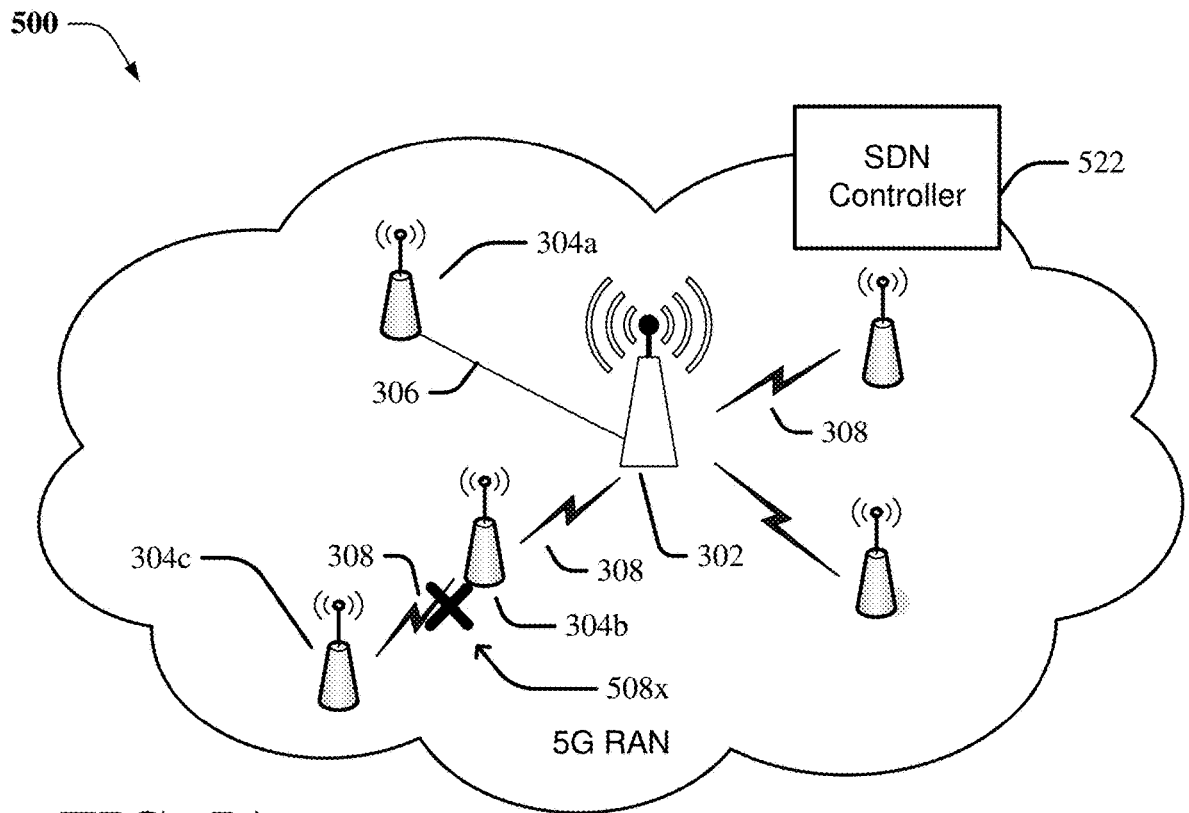
FIG. 5A-5B illustrates an example small cell network according to one or more embodiments.

Referring now to FIG. 5A, illustrated is an example a small cell network 500 having a failed wireless connection in accordance with various aspects and embodiments described herein. Repetitive description of like elements employed in other embodiments described herein is omitted for sake of brevity. In some embodiment, as illustrated, a connection failure 508x has occurred at wireless connection 308 between small cell 304c and macro cell 302. In response to detecting the connection failure 508x, the small cell 304c can scan nearby cells (e.g., macro cell or other small cells) to reestablish the connection. In some embodiments, the small cell 304c can ping the macro cell 302, small cell 304b and small cell 304e to select the new cell based on, but not limited to, RF signal strength and network conditions.

Figure 5B:
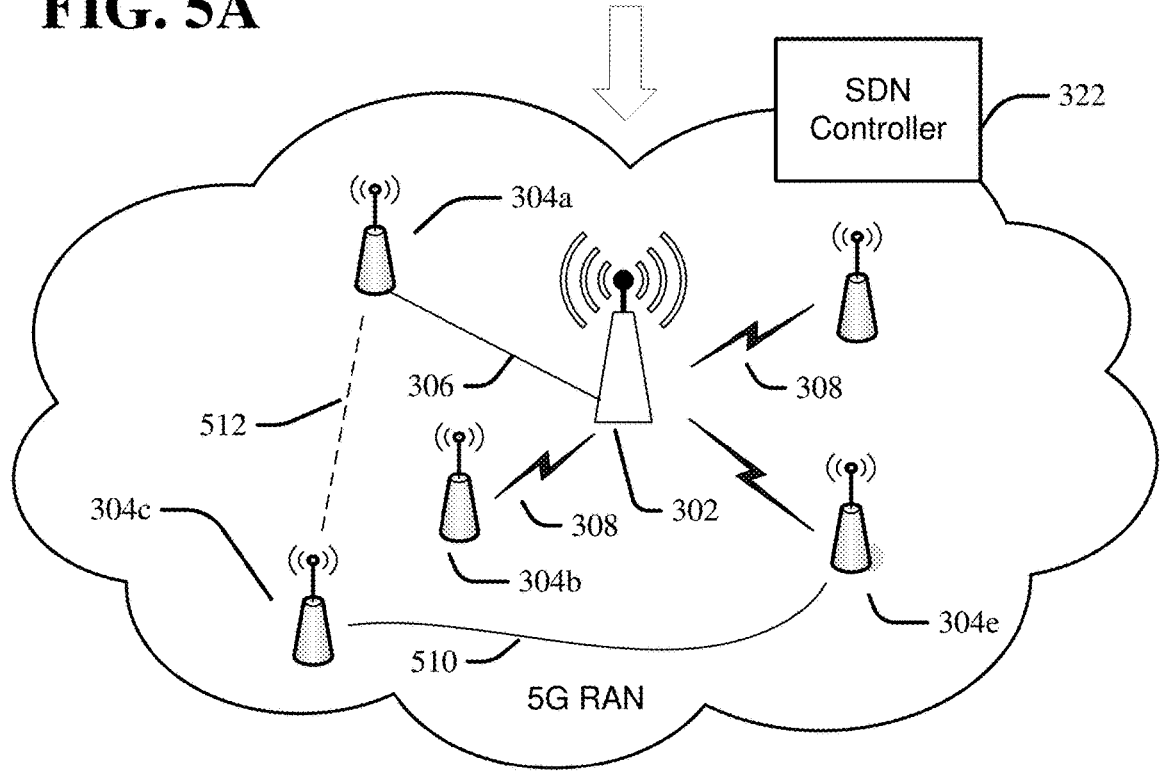

Referring now to FIG. 5B, illustrated is an example a small cell network 500 after having a new connection in accordance with various aspects and embodiments described herein. Repetitive description of like elements employed in other embodiments described herein is omitted for sake of brevity. In some embodiment, as illustrated, upon selecting a new cell, for example small cell 304e, a new connection 510 is established. As discussed below, the small cell can transmit a signal using minimum bandwidth to notify the SDN controller 322, via the macro cell 302 or small cell 304e, that a connection failure has occurred, and new resources are needed to establish a new connection between small cell 304c and small cell 304e (e.g., a new relay device). In some embodiments, the small cell 304c can send a signal to SDN controller 322 via small cell 304a that is communicatively connected to the SDN controller 322. In some embodiments, the new connection 510 is a wireless connection between small cell 304c and small cell 304e. In some embodiments, the small cell 304c can establish a connection to small cell 304a, wherein the communication to macro cell can be both a wireless connection 512 and wired connection 306 (e.g., fiber backhaul connection). In some embodiments, the SDN controller 322 can update the network graph indicating the new connection (e.g., connection 510 or connection 512) upon receiving confirmation from the small cell 304c.

Figure 6:
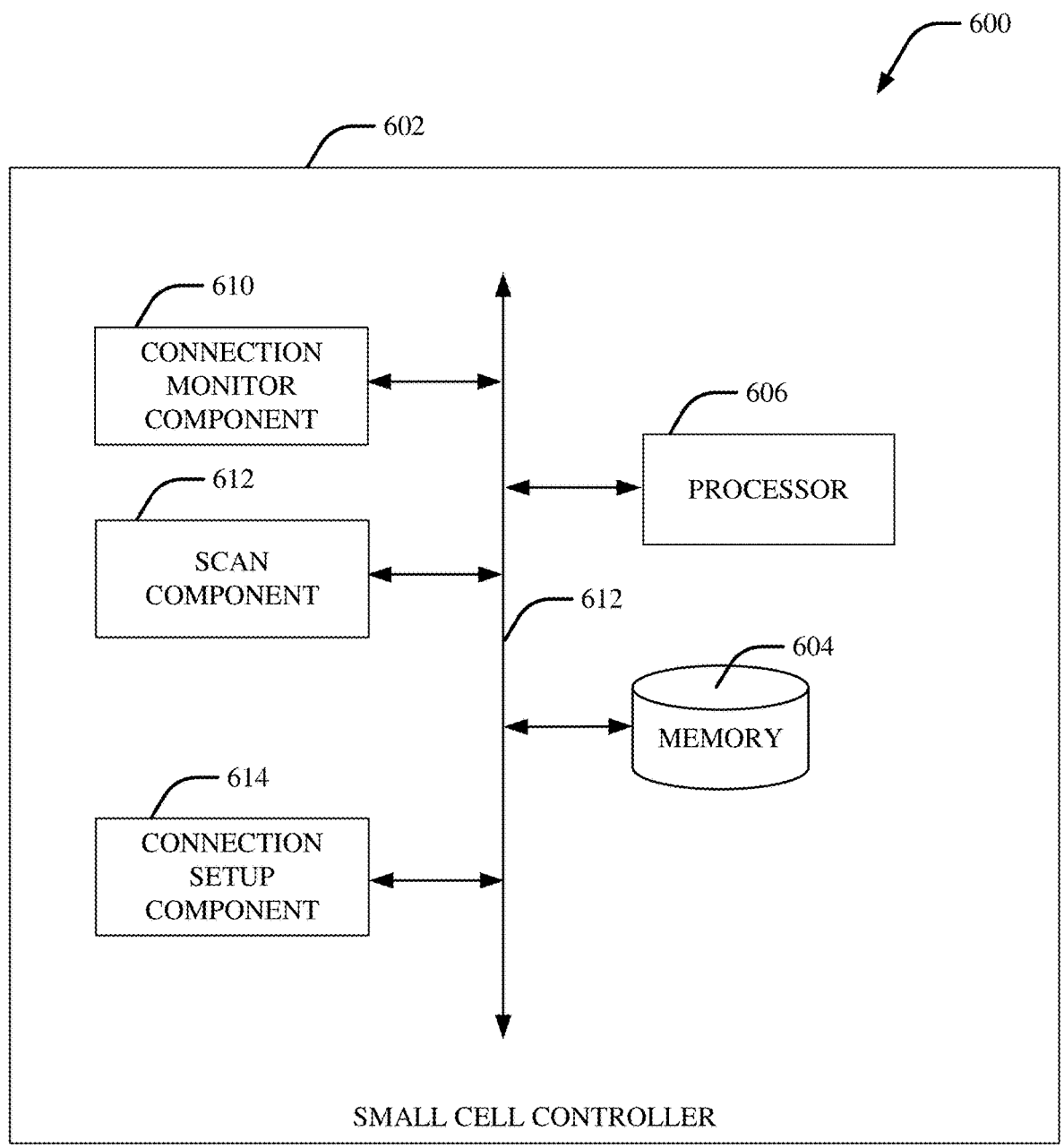
FIG. 6 illustrates a block diagram of an example, non-limiting system that facilitates operation of dynamic self-backhaul system in accordance with one or more embodiments described herein.

FIG. 6 illustrates a block diagram of an example, non-limiting system 600 that facilitates operation of dynamic self-backhaul system in accordance with one or more embodiments described herein. Repetitive description of like elements employed in respective embodiments is omitted for sake of brevity. According to some embodiments, the system 600 can comprise a small cell having a small cell controller 602. In some embodiments, the small cell controller 602 can also include or otherwise be associated with a memory 604, a processor 606 that executes computer executable components stored in a memory 604. The small cell controller 602 can further include a system bus 608 that can couple various components including, but not limited to, a connection monitor component 610, a scan component 612, and a connection setup component 614.

Aspects of systems (e.g., the small cell controller 602 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the small cell controller 602 can comprise various computer and/or computing-based elements described herein with reference to operating environment 1000 and FIG. 10. In several embodiments, such computer and/or computing-based elements can be used in connection with implementing one or more of the systems, devices, and/or components shown and described in connection with FIG. 6 or other figures disclosed herein.

According to several embodiments, the memory 604 can store one or more computer and/or machine readable, writable, and/or executable components and/or instructions that, when executed by processor 606, can facilitate performance of operations defined by the executable component(s) and/or instruction(s). For example, the memory 604 can store computer and/or machine readable, writable, and/or executable components and/or instructions that, when executed by the processor 606, can facilitate execution of the various functions described herein relating to the connection monitor component 610, the scan component 612, and the connection setup component 614.

In several embodiments, the memory 604 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 604 are described below with reference to system memory 1006 and FIG. 10. Such examples of memory 604 can be employed to implement any embodiments of the subject disclosure.

According to some embodiments, the memory 604 can maintain RF signal strength information of nearby small cells 304 of the small cell network 400. The memory 604 can also maintain location information of nearby small cells 304 (e.g., small cell 304a can store location and RF signal strength information of small cell 304b and small cell 304c).

According to some embodiments, the processor 606 can comprise one or more types of processors and/or electronic circuitry that can implement one or more computer and/or machine readable, writable, and/or executable components and/or instructions that can be stored on the memory 604. For example, the processor 606 can perform various operations that can be specified by such computer and/or machine readable, writable, and/or executable components and/or instructions including, but not limited to, logic, control, input/output (I/O), arithmetic, and/or the like. In some embodiments, processor 606 can comprise one or more central processing unit, multi-core processor, microprocessor, dual microprocessors, microcontroller, System on a Chip (SOC), array processor, vector processor, and/or another type of processor.

In some embodiments, the processor 606, the memory 604, the connection monitor component 610, the scan component 612, and/or the connection setup component 614 can be communicatively, electrically, and/or operatively coupled to one another via the system bus 608 to perform functions of the small cell controller 602, and/or any components coupled therewith. In several embodiments, the system bus 608 can comprise one or more memory bus, memory controller, peripheral bus, external bus, local bus, and/or another type of bus that can employ various bus architectures.

In several embodiments, the small cell controller 602 can comprise one or more computer and/or machine readable, writable, and/or executable components and/or instructions that, when executed by the processor 606, can facilitate performance of operations defined by such component(s) and/or instruction(s). Further, in numerous embodiments, any component associated with the small cell controller 602, as described herein with or without reference to the various figures of the subject disclosure, can comprise one or more computer and/or machine readable, writable, and/or executable components and/or instructions that, when executed by the processor 606, can facilitate performance of operations defined by such component(s) and/or instruction(s). For example, the connection monitor component 610, and/or any other components associated with the small cell controller 602 (e.g., communicatively, electronically, and/or operatively coupled with and/or employed by small cell controller 602), can comprise such computer and/or machine readable, writable, and/or executable component(s) and/or instruction(s). Consequently, according to numerous embodiments, the small cell controller 602 and/or any components associated therewith, can employ the processor 606 to execute such computer and/or machine readable, writable, and/or executable component(s) and/or instruction(s) to facilitate performance of one or more operations described herein with reference to the small cell controller 602 and/or any such components associated therewith.

In some embodiments, the small cell controller 602 can facilitate performance of operations related to and/or executed by the components of small cell controller 602, for example, the processor 606, the memory 604, the connection monitor component 610, the scan component 612, and the connection setup component 614. For example, as described in detail below, the small cell controller 602 can facilitate: detecting (e.g., by the connection monitor component 610) a failure in a backhaul communication link between a first node device and a second node device, wherein the second node device is communicatively connected to a core network device of a core network; selecting (e.g., scan component 612) a new node device, other than the first node device and the second node device, that is communicatively connected to the core network device for establishment of a new backhaul communication link to replace the backhaul communication link; and establishing (e.g., by the connection setup component 614) a connection with the new node device to provide a backhaul communication link failure indication to a controller and to request the controller to provide resources to establish the new backhaul communication link with the new node device.

In some embodiments, the connection monitor component 610 monitors both the wire and wireless connections with the macro cell 302 (FIG. 3). In some embodiments, the connection monitor component 610 detects a failure in a backhaul communication link between a first node device and a second node device if there is no data traffic or using various connection monitoring techniques to detect if the connection to macro cell 302 has failed. For example, in some embodiments, when the random-access node cannot communicate with core network because there is no downlink or uplink traffic (e.g., no downlink message/data received or unable to transmit uplink message/data), the monitor component 610 may consider that as the self-backhual link is down. In some embodiment, the connection monitor component 610 can periodically monitor various connection channels (e.g., a broadcast channel) to determine if the connection to the macro cell 302 is operational. In some embodiments, the connection monitor component 610 detects the backhaul connection failure when data transmission abruptly stops (e.g., the processor no longer can process any data packets) or the macro cell 302 does not respond to any communication requests.

In some embodiments, the scan component 612, can comprise one or more processors, memory, and electrical circuitry. In some embodiments, the scan component 612 can scan for a third node device (e.g., macro cell 302 or one of the small cells 304), which is communicatively connected to the core network, to establish a second backhaul communication link. The scan component 612 can scan all available cells, both macro cells and multiple small cells within geographical location or within signal range (e.g., RF signal strong enough to communicate data with the cell). The scan component 612 can select the best suited cell to establish the second backhaul communication link (e.g., new backhaul communication link to replace the failed connection). For example, the small cell controller 602 can select either the macro cell or other small cell based on best RF signal strength (e.g., the RF signal strength that can maintain communication with the first node device and the selected node device).

In some embodiments, the small cell controller 602 can comprise a connection setup component 614 that can setup a new connection with the third node device (e.g., a small cell or macro cell selected based on RF signal strength). In some embodiments, upon selecting the new node to establish a new backhaul connection after a failed connection, the small cell controller can transmit a signal, using a minimum bandwidth (e.g., sufficient resources to indicate a connection failure and requesting new resources), to the SDN controller. For example, the minimum bandwidth require can be transmission of message comprising 8 bits (e.g., 1 bit to indicate failure, 2 bits to indicate cell id, 2 bits for macro cell id, 1 bit to request new resources, 2 bits for new cell id) of information. Depending on the size of the cell id (e.g., a system that identifies cell using 4 bits), additional bits may be employed to indicate the connection failed between small cell and macro cell/small cell and to request new resources to establish connection with newly selected node device. In some embodiments, location information of the selected cell (e.g., macro cell or small cell) can be communicated as part of the signal, which may require additional bandwidth. The message is communicated to the macro cell using a wireless connection. The macro cell relays the message to SDN controller 322 indicating the loss of connection and request for resources to establish connection using a different node device. In response to request for resources, the SDN controller 322 can analyze the available resources (e.g., partition the resources) based on network conditions and data analytics to provide appropriate resources. The SDN controller 322 can communicate the new resources the new connection, via the macro cell, to the requesting the small cell controller 602. In response the small cell controller 602 can transmit an acknowledge the receipt. The SDN controller 322 can thereafter update the network graph showing the new backhaul connection (e.g., a new connection with first node device and new node device).

Figure 7:
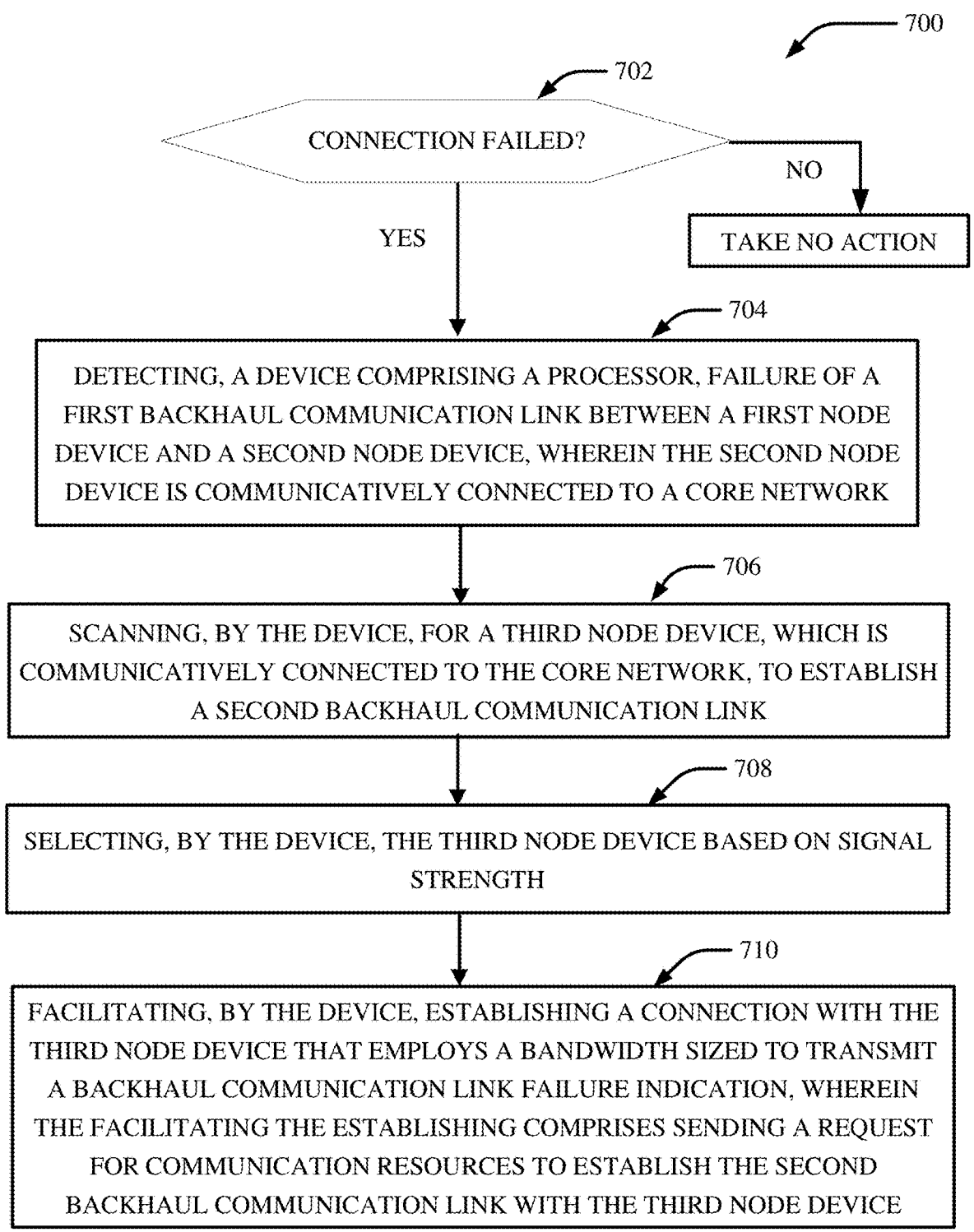
FIG. 7 depicts a diagram of an example, non-limiting computer implemented method that facilitates dynamic self-backhaul system in accordance with one or more embodiments described herein.

FIG. 7 depicts a diagram of an example, non-limiting computer implemented method that facilitates dynamic self-backhaul system in accordance with one or more embodiments described herein. Repetitive description of like elements employed in other embodiments described herein is omitted for sake of brevity. In some examples, flow diagram 700 can be implemented by operating environment 1000 described below. It can be appreciated that the operations of flow diagram 700 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts determining if connection failed (e.g., wired or wireless backhaul connection). If the backhaul connection failed, then perform operation 704. Otherwise, take no action and continue monitoring the connection. Operation 704 depicts detecting, a device comprising a processor, failure of a first backhaul communication link between a first node device and a second node device, wherein the second node device is communicatively connected to a core network (e.g., detecting failure of the wired or wireless backhaul communication link between the small cell and a macro cell or another small cell connected to macro cell). Operation 706 depicts scanning, by the device, for a third node device, which is communicatively connected to the core network, to establish a second backhaul communication link (e.g., in response to detecting a communication link failure, scan through all nearby macros cells or small cells). In some embodiments, any initial acquisition process may be employed to scan for an alternate cell to reestablish backhaul connection. Operation 708 depicts selecting, by the device, the third node device based on signal strength (e.g., the device may select the best suitable macro cell or small cell to reestablish the backhaul connection). In some embodiments, the device scans for the best (e.g., based on strongest RF signal strength) available macro cell or small cell to reestablish the backhaul connection. Operation 710 depicts facilitating, by the device, establishing a connection with the third node device that employs a bandwidth sized to transmit a backhaul communication link failure indication, wherein the facilitating the establishing comprises sending a request for communication resources to establish the second backhaul communication link with the third node device (e.g., using minimum bandwidth to send a signal to SDN via a macro cell to facilitate reestablishing the backhaul connections). In some embodiments, the minimum bandwidth comprises a bandwidth that carries a notification of connection failure and request for new connection with new macro cell or small cell.

Figure 8:
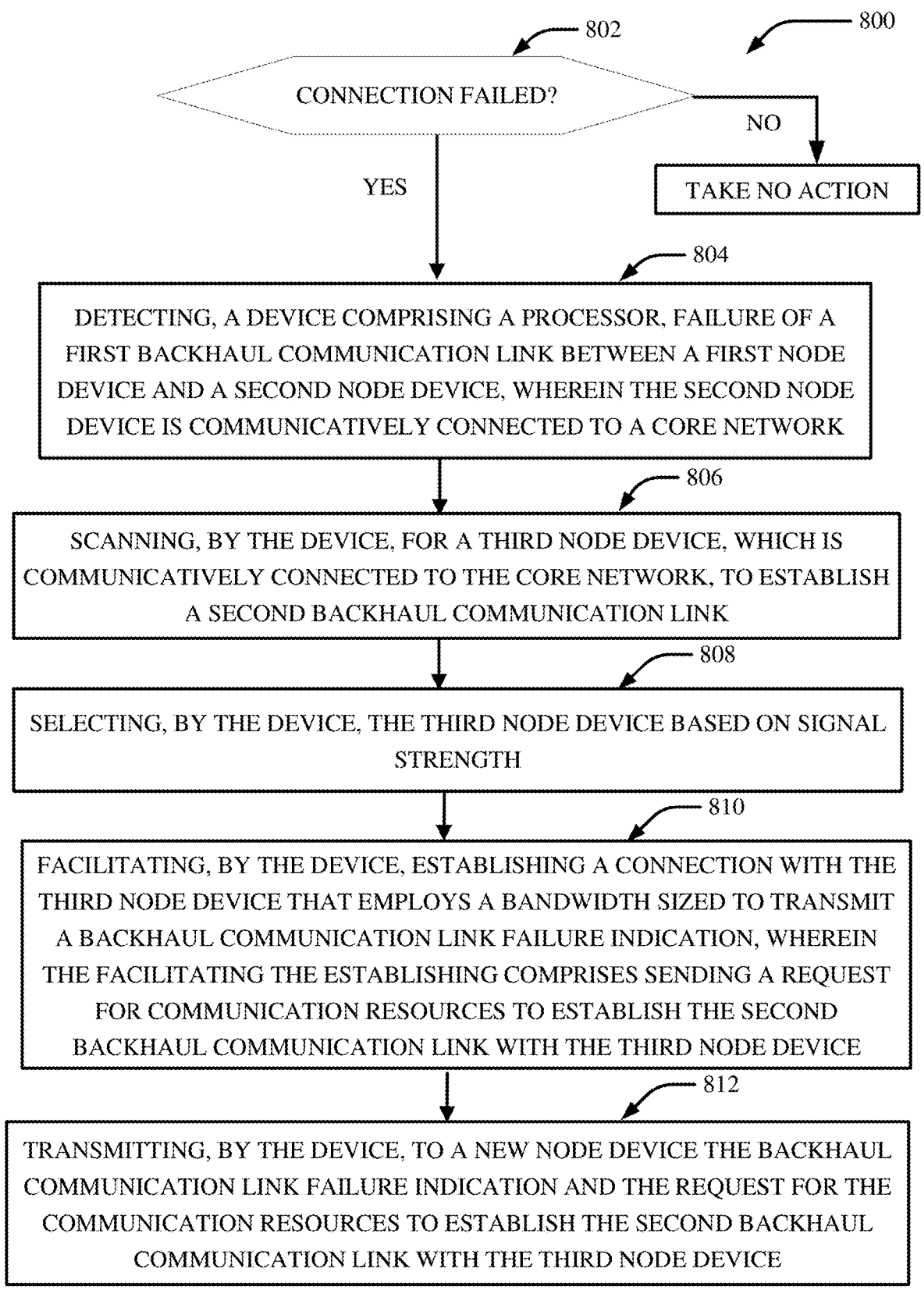
FIG. 8 depicts a diagram of an example, non-limiting computer implemented method that facilitates dynamic self-backhaul system in accordance with one or more embodiments described herein.

FIG. 8 depicts a diagram of an example, non-limiting computer implemented method that facilitates dynamic self-backhaul system in accordance with one or more embodiments described herein. Repetitive description of like elements employed in other embodiments described herein is omitted for sake of brevity. In some examples, flow diagram 800 can be implemented by operating environment 1000 described below. It can be appreciated that the operations of flow diagram 800 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts determining if connection failed (e.g., wired or wireless backhaul connection). If the backhaul connection failed, then perform operation 804. Otherwise, take no action and continue monitoring the connection. Operation 804 depicts detecting, a device comprising a processor, failure of a first backhaul communication link between a first node device and a second node device, wherein the second node device is communicatively connected to a core network (e.g., detecting failure of the wired or wireless backhaul communication link between the small cell and a macro cell or another small cell connected to macro cell). Operation 806 depicts scanning, by the device, for a third node device, which is communicatively connected to the core network, to establish a second backhaul communication link (e.g., in response to detecting a communication link failure, scan through all nearby macros cells or small cells). In some embodiments, any initial acquisition process may be employed to scan for an alternate cell to reestablish backhaul connection. Operation 808 depicts selecting, by the device, the third node device based on signal strength (e.g., the device may select the best suitable macro cell or small cell to reestablish the backhaul connection). In some embodiments, the device scans for the best (e.g., based on strongest RF signal strength) available macro cell or small cell to reestablish the backhaul connection. Operation 810 depicts facilitating, by the device, establishing a connection with the third node device that employs a bandwidth sized to transmit a backhaul communication link failure indication, wherein the facilitating the establishing comprises sending a request for communication resources to establish the second backhaul communication link with the third node device (e.g., using minimum bandwidth to send a signal to SDN via a macro cell to facilitate reestablishing the backhaul connections). In some embodiments, the minimum bandwidth comprises a bandwidth that carries a notification of connection failure and request for new connection with new macro cell or small cell. Operation 812 depicts transmitting, by the device, to a new node device the backhaul communication link failure indication and the request for the communication resources to establish the second backhaul communication link with the third node device.

Figure 9:
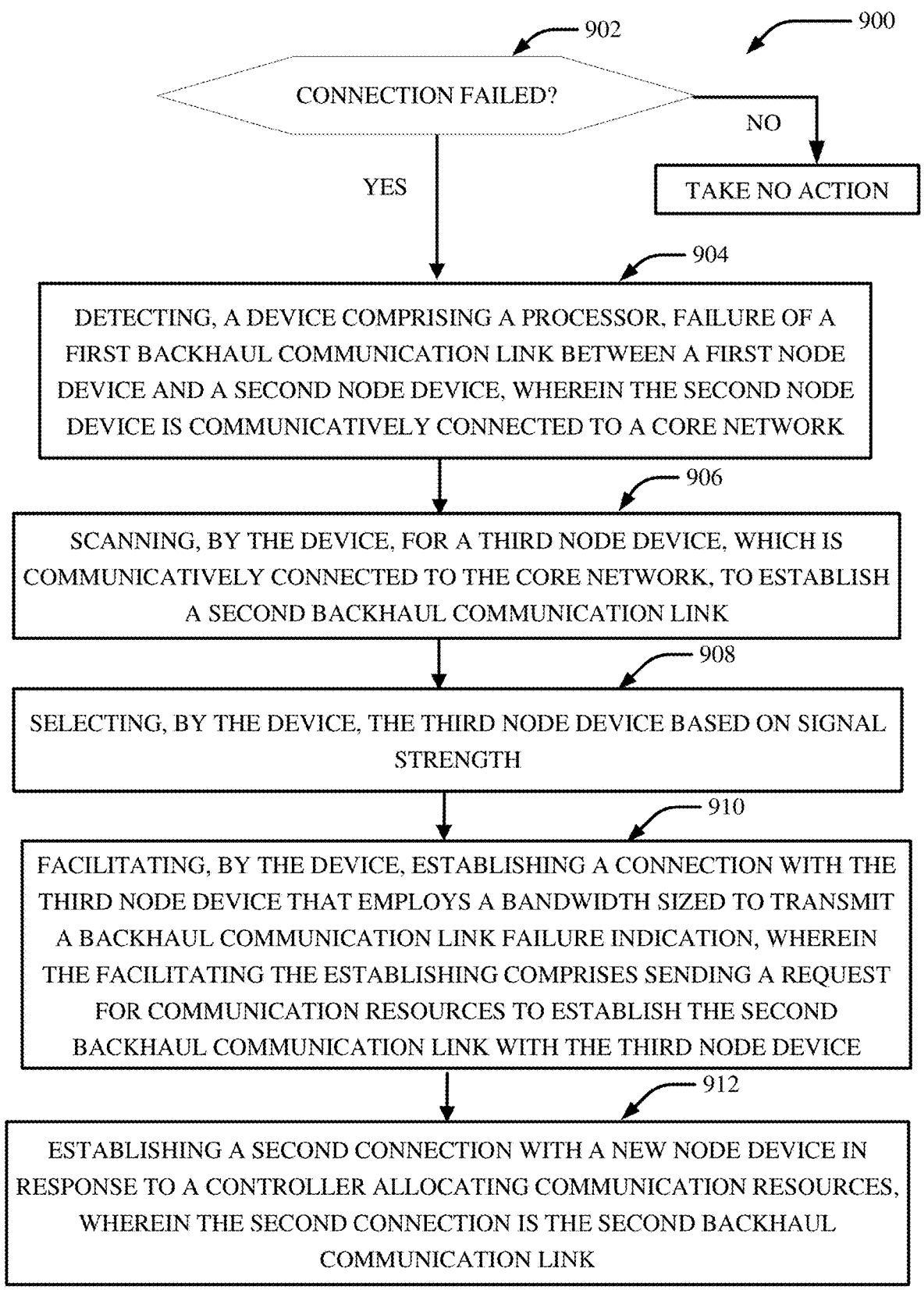
FIG. 9 depicts a diagram of an example, non-limiting computer implemented method that facilitates dynamic self-backhaul system in accordance with one or more embodiments described herein.

FIG. 9 depicts a diagram of an example, non-limiting computer implemented method that facilitates dynamic self-backhaul system in accordance with one or more embodiments described herein. Repetitive description of like elements employed in other embodiments described herein is omitted for sake of brevity. In some examples, flow diagram 900 can be implemented by operating environment 1000 described below. It can be appreciated that the operations of flow diagram 900 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts determining if connection failed (e.g., wired or wireless backhaul connection). If the backhaul connection failed, then perform operation 904. Otherwise, take no action and continue monitoring the connection. Operation 904 depicts detecting, a device comprising a processor, failure of a first backhaul communication link between a first node device and a second node device, wherein the second node device is communicatively connected to a core network (e.g., detecting failure of the wired or wireless backhaul communication link between the small cell and a macro cell or another small cell connected to macro cell). Operation 906 depicts scanning, by the device, for a third node device, which is communicatively connected to the core network, to establish a second backhaul communication link (e.g., in response to detecting a communication link failure, scan through all nearby macros cells or small cells). In some embodiments, any initial acquisition process may be employed to scan for an alternate cell to reestablish backhaul connection. Operation 908 depicts selecting, by the device, the third node device based on signal strength (e.g., the device may select the best suitable macro cell or small cell to reestablish the backhaul connection). In some embodiments, the device scans for the best (e.g., based on strongest RF signal strength) available macro cell or small cell to reestablish the backhaul connection. Operation 910 depicts facilitating, by the device, establishing a connection with the third node device that employs a bandwidth sized to transmit a backhaul communication link failure indication, wherein the facilitating the establishing comprises sending a request for communication resources to establish the second backhaul communication link with the third node device (e.g., using minimum bandwidth to send a signal to SDN via a macro cell to facilitate reestablishing the backhaul connections). In some embodiments, the minimum bandwidth comprises a bandwidth that carries a notification of connection failure and request for new connection with new macro cell or small cell. Operation 912 depicts establishing a second connection with a new node device in response to a controller allocating communication resources, wherein the second connection is the second backhaul communication link (e.g., establishing connection after the SDN provide necessary resources).

Figure 10:
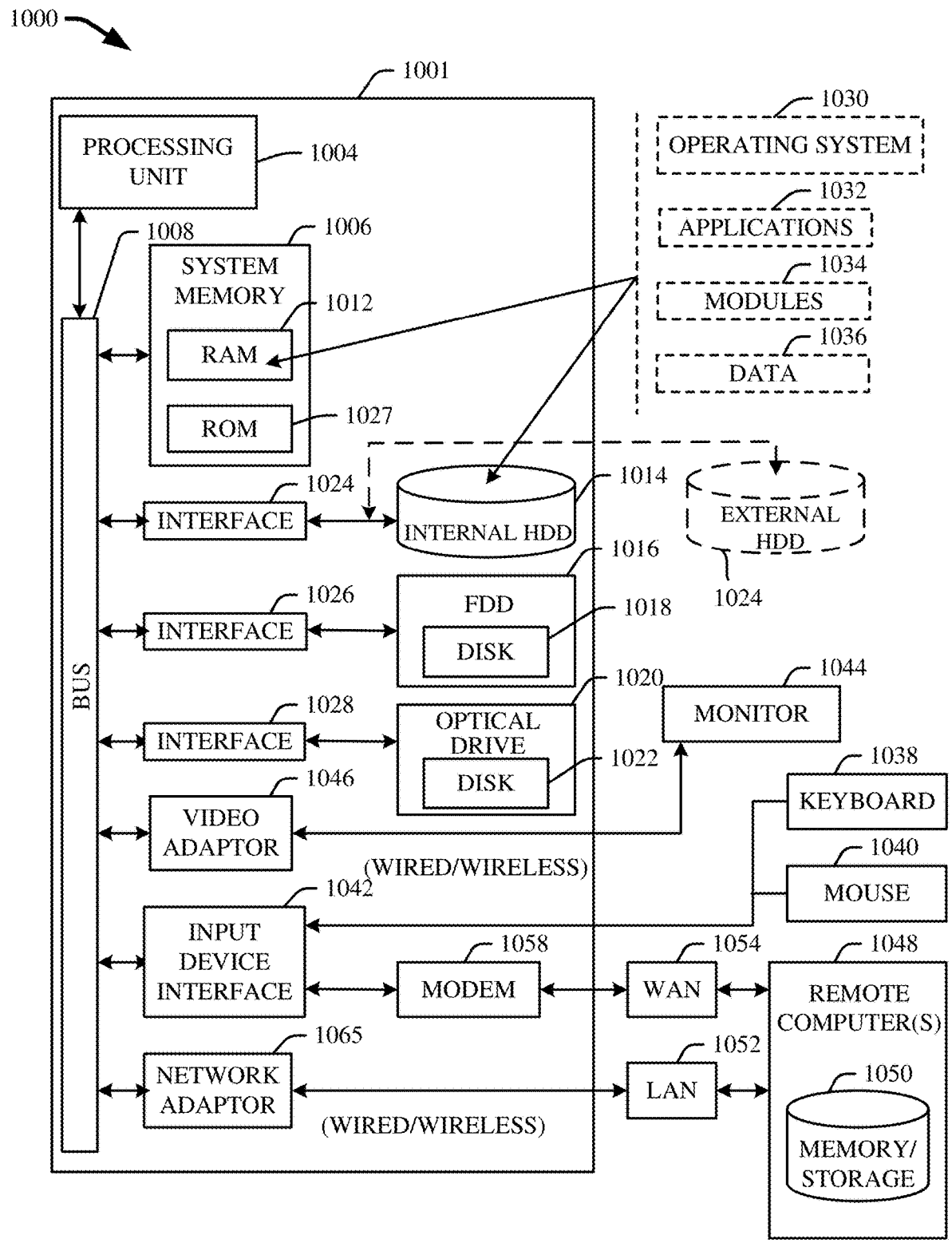
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., MICROSOFT™ server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1000, which can be, for example, part of the hardware of system 1020, includes a processing unit 1014, a system memory 1006, and a system bus 1018. System bus 1018 couples system components including, but not limited to, system memory 1006 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1094), and Small Computer Systems Interface (SCSI).

System memory 1006 can include volatile memory 1020 and nonvolatile memory 1022. A basic input/output system (BIOS), containing routines to transfer information between elements within computer 1000, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM 1012, which acts as external cache memory. By way of illustration and not limitation, RAM 1012 is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1000 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1000. System applications 1030 take advantage of the management of resources by operating system 1028 through program modules 1032 and program data 1034 stored either in system memory 1006 or on disk storage 1024. It is to be noted that the disclosed subject matter can be implemented with various operating systems or combinations of operating systems.

A user can enter commands or information into computer 1000 through input device(s) 1036. As an example, a mobile device and/or portable device can include a user interface embodied in a touch sensitive display panel allowing a user to interact with computer 1000. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a BLUETOOTH™ port, an IP port, or a logical port associated with a wireless service, etc. Output device(s) 1040 and a move use some of the same type of ports as input device(s) 1036.

Thus, for example, a USB port can be used to provide input to computer 1000 and to output information from computer 1000 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1000 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1000.

For purposes of brevity, only a memory storage device 1046 is illustrated with remote computer(s) 1044. Remote computer(s) 1044 is logically connected to computer 1000 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1000, it can also be external to computer 1000. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include GEOCAST™ technology; broadcast technologies (e.g., sub-Hz, ELF, VLF, LF, MF, HF, VHF, UHF, SHF, THz broadcasts, etc.); Ethernet; X.25; typo POWERLINE™-type networking (e.g., POWERLINE™ AV Ethernet, etc.); femto-cell technology; WI-FI™; Worldwide Interoperability for Microwave Access (WIMAX™); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

Performing aggregation above the RLC makes it possible to perform the routing and aggregation at the same protocol sublayer. Thus, additional possibilities in terms of taking into account routing information while performing bearer aggregation can be used to facilitate a more efficient system. Additionally, it also reduces the impact on standards for lower protocol stack layers. Similarly, the benefits of performing aggregation below the RLC are that it can reduce the demand for LCID space extension when trying to support 1:1 mapping of UE bearers to backhaul channels.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, comprising:
detecting a failure in a backhaul communication link between base station equipment and backhaul equipment, wherein the backhaul equipment is communicatively connected to core network equipment that is part of a core network;
based on satisfying a criterion applied to a signal strength associated with other network equipment, other than the base station equipment, the backhaul equipment, and the core network equipment, selecting the other network equipment that is communicatively connected to the core network equipment for establishment of a replacement backhaul communication link to replace the backhaul communication link;
establishing a connection with the other network equipment that employs a bandwidth that has been sized to transmit a request to establish the replacement backhaul communication link with the other network equipment; and
transmitting, to the other network equipment, the request to establish the replacement backhaul communication link, wherein the request comprises a request for communication resources to establish the replacement backhaul communication link with the other network equipment.

2. The system of claim 1, wherein the backhaul communication link comprises a wired link.

3. The system of claim 1, wherein the backhaul communication link comprises a wireless link.

4. The system of claim 1, wherein selecting the other network equipment comprises identifying the other network equipment based on the signal strength and tuning to the other network equipment.

5. The system of claim 1, wherein the base station equipment comprises a millimeter wave transmit and receive point, wherein the backhaul equipment comprises macrocell equipment, and wherein the base station equipment and the backhaul equipment are communicatively connected via the backhaul communication link that comprises a wired link.

6. The system of claim 1, wherein the base station equipment comprises a first millimeter wave transmit and receive point, wherein the backhaul equipment comprises a second millimeter wave transmit and receive point, and wherein the base station equipment and the backhaul equipment are communicatively connected via the backhaul communication link that comprises a wireless link.

7. The system of claim 1, wherein establishing the connection comprises establishing a wireless connection employing first bandwidth that carries signaling information.

8. The system of claim 1, wherein the connection comprises a first connection, and wherein the operations further comprise:
initiating a second connection with the other network equipment in response to controller equipment allocating the communication resources to establish the second connection, wherein the second connection comprises the replacement backhaul communication link.

9. A method, comprising:
detecting, by network equipment comprising a processor, failure of a first backhaul communication link between base station equipment and first backhaul equipment, wherein the first backhaul equipment is communicatively connected to a core network;
selecting, by the network equipment, second backhaul equipment based on determining that a criterion, applied to a characteristic of a signal associated with the second backhaul equipment, is satisfied;
facilitating, by the network equipment, establishing a connection with the second backhaul equipment that employs a bandwidth that has been sized to transmit a first request to establish a second backhaul communication link with the second backhaul equipment; and
transmitting, by the network equipment to the second backhaul equipment, the first request, wherein the first request comprises a request for communication resources to establish the second backhaul communication link with the second backhaul equipment.

10. The method of claim 9, wherein the first request comprises a backhaul communication link failure indication, and wherein the transmitting the first request comprises transmitting a second request for the communication resources to establish the second backhaul communication link with the second backhaul equipment.

11. The method of claim 9, further comprising, scanning, by the network equipment, for the second backhaul equipment, which is communicatively connected to the core network, to establish the second backhaul communication link.

12. The method of claim 9, wherein the first backhaul communication link comprises a wireless link, and wherein, in response to detecting the failure of the first backhaul communication link, the selecting is triggered to recover from the failure of the first backhaul communication link.

13. The method of claim 9, wherein the base station equipment comprises a millimeter wave transmit and receive point and the base station equipment comprises macrocell equipment, and wherein the base station equipment and the first backhaul equipment are communicatively connected via the first backhaul communication link that comprises a wired link.

14. The method of claim 9, wherein the base station equipment comprises a first millimeter wave transmit and receive point and the first backhaul equipment comprises a second millimeter wave transmit and receive point, and wherein the base station equipment and the first backhaul equipment are communicatively connected via the first backhaul communication link that comprises a wireless link.

15. The method of claim 9, wherein the connection comprises a first connection, and further comprising:
establishing, by the network equipment, a second connection with the second backhaul equipment in response to controller equipment allocating communication resources, wherein the second connection comprises the second backhaul communication link.

16. The method of claim 9, wherein the criterion comprises a strongest signal strength, and wherein the selecting of the second backhaul equipment comprises selecting the second backhaul equipment with the strongest signal strength from a group of backhaul equipment.

17. First network equipment, comprising:
a processor; and
a memory that stores executable instructions that, when executed by the processor, facilitate performance of operations, comprising:

detecting a failure of a backhaul communication link between a base station and backhaul equipment, wherein the backhaul equipment is communicatively connected to core network equipment;

based on a result of evaluating a criterion with respect to a signal strength associated with second network equipment other than the first network equipment, the base station and the backhaul equipment, selecting the second network equipment for use in establishing a different backhaul communication link in response to detecting the failure of the backhaul communication link, wherein the second network equipment is communicatively connected to the core network equipment;

establishing a first connection with the second network equipment that employs a bandwidth that has been sized to transmit a request to establish the different backhaul communication link with the second network equipment; and transmitting, to the second network equipment, the request to establish the different backhaul communication link with the second network equipment, wherein the request comprises a request for communication resources to establish the different backhaul communication link with the second network equipment.

18. The first network equipment of claim 17, wherein the request comprises a backhaul communication link failure indication.

19. The first network equipment of claim 17, wherein the operations further comprise:

initiating a second connection with the second network equipment in response to controller equipment allocating the communication resources for the different backhaul communication link.

20. The first network equipment of claim 17, wherein the backhaul communication link comprises a wireless link, and wherein the backhaul equipment comprises a millimeter wave transmit and receive point.

* * * * *